United States Patent [19]

Burkett

[11] Patent Number: 4,877,374
[45] Date of Patent: Oct. 31, 1989

[54] SELF-REGULATING WINDMILL

[76] Inventor: Bill Burkett, 4319 Los Serranos Blvd., Chino, Calif. 91709

[21] Appl. No.: 299,886

[22] Filed: Jan. 23, 1989

Related U.S. Application Data

[63] Continuation-in-part of Ser. No. 186,380, Apr. 26, 1988, abandoned.

[51] Int. Cl.$^4$ ............................................... F03D 7/04
[52] U.S. Cl. ........................................ 416/136; 416/23; 416/41; 416/237
[58] Field of Search ................... 416/23, 41 A, 44 A, 416/136, 137, 139 A, 170 A, 237 A, 237 B

[56] References Cited

U.S. PATENT DOCUMENTS

| | | | |
|---|---|---|---|
| 30,038 | 9/1860 | Babcock | 416/135 A |
| 132,487 | 10/1872 | Palmer | 416/137 |
| 144,137 | 10/1873 | Radway | 74/381 |
| 307,312 | 10/1884 | Leavitt | 416/137 |
| 361,709 | 4/1887 | McMaster | 416/137 |
| 726,376 | 4/1903 | Tompkins | 416/137 |
| 1,780,431 | 11/1930 | McCarroll | 416/23 X |
| 2,037,528 | 4/1936 | Miller | 416/132 B |
| 2,099,922 | 11/1937 | Bellman | 416/135 |
| 2,134,661 | 10/1938 | Everts | 416/132 B |
| 2,454,440 | 11/1948 | Foulston | 416/23 |
| 2,493,895 | 1/1950 | Osterback | 416/41 A X |
| 2,622,686 | 12/1952 | Chevreau et al. | 416/23 |
| 4,050,246 | 9/1977 | Bourquardez | 416/23 X |
| 4,068,131 | 1/1978 | Jacobs et al. | 416/170 A X |
| 4,178,127 | 12/1979 | Zahorecz | 416/23 |
| 4,257,740 | 3/1981 | Duez | 416/137 |
| 4,291,235 | 9/1981 | Bergey et al. | 416/139 A X |
| 4,311,435 | 1/1982 | Bergero | 416/170 A |
| 4,335,996 | 6/1982 | Ross | 416/88 |

FOREIGN PATENT DOCUMENTS

| | | | |
|---|---|---|---|
| 912530 | 5/1954 | Fed. Rep. of Germany | 416/23 |
| 829670 | 7/1938 | France | 416/135 A |
| 912906 | 8/1946 | France | 416/23 |
| 58483 | 11/1953 | France | 416/44 A |
| 2569243 | 2/1986 | France | 416/132 B |
| 444829 | 2/1949 | Italy | 416/23 |
| 540701 | 3/1956 | Italy | 416/23 |
| 102074 | 9/1946 | Netherlands | 416/23 |
| 67326 | 1/1944 | Norway | 416/135 A |
| 377542 | 7/1973 | U.S.S.R. | 416/23 |

Primary Examiner—Everette A. Powell, Jr.
Attorney, Agent, or Firm—Richard F. Carr; Richard L. Gausewitz; Allan Rothenberg

[57] ABSTRACT

A windmill is provided which automatically compensates for increased wind velocity, causing the blades to feather and rotate at a substantially constant velocity rather than overspeeding. This is accomplished by pivotally mounting the blades so that they are rotatable between positions of relatively high angle with respect to the direction of the wind and positions of relatively shallow angle, with a resilient means biasing them to the former position. Tabs projecting forwardly at obtuse angles from the outer ends of the leading edges of the blades cause the blades to be pivoted to the feathered position when wind velocity increases.

10 Claims, 3 Drawing Sheets

SELF-REGULATING WINDMILL

CROSS-REFERENCE TO RELATED APPLICATION

This application is a continuation-in-part of application Ser. No. 186,380, filed Apr. 26, 1988, for Self-Regulating Windmill, now abandoned.

BACKGROUND OF THE INVENTION

A continuing problem with windmills is the positioning of the blades to rotate and produce power under low wind velocities, while, at the same time, avoiding overspeeding and damage at high wind velocities. Conventionally, a windmill will have a means to cause the entire rotor to turn to a position where the plane of rotation of the blades is parallel to the direction of the wind when wind velocity becomes excessive. This preserves the mill and prevents damage, but the blades then no longer rotate and the windmill is prevented from performing useful work under high winds. Manual operation may be required to turn the rotor to the proper safety position.

Alternatively, mechanisms have been proposed which rely upon centrifugal force generated by the turning of the rotor of the mill to cause the blades to pivot to a feathered position under high winds. These mechanisms are generally complicated, expensive, heavy, and may not be reliable.

SUMMARY OF THE INVENTION

The present invention provides a simplified means which will prevent overspeeding of the rotor of a windmill without requiring the rotor to be turned out of the wind and without the use of centrifugal force devices. The invention allows the mill to turn at a relatively constant velocity over a wide range of wind speeds, even under high wind conditions. Therefore, it can continue to generate power during wind velocities ranging from very light winds to very strong winds, and will not be damaged under any condition.

The windmill is provided with a hub mounted to rotate about a horizontal axis facing into the wind. Blades project radially from the hub. Each blade is pivotal relative to the hub between two positions. In one position, used for startup and in light winds, the blade is at a relatively large angle to the direction of the wind, which means that it is at a relatively shallow angle with respect to the plane of rotation of the mill. In the other position, it is effectively feathered, being at a relatively shallow angle with respect to the direction of the wind. A resilient means in the form of a torsion spring engaging the inner end of a shaft upon which the blade is mounted biases the blade toward the first position. A stop, carried by the shaft of the blade, engages surfaces of the hub assembly to limit the pivotal movement to the two extreme positions.

The blade is an elongated element, which may be a flat rectangular sheet, and is provided with a tab or fin at its outer end. The tab projects forwardly at an obtuse angle from the outer end of the leading edge of the blade. This means that the angle of the tab relative to the wind direction is less in the first pivotal position of the blade than is the principal surface of the blade. The tab acts to assist the windmill to commence rotation in light winds, adding to the torque produced under those conditions. However, the tab is reacted upon by the air as the mill rotates, creating a force tending to pivot the blade toward the feathered condition. When high wind velocities increase the rotational speed sufficiently, this force will overcome the spring force that biases the blade toward its first position. The blade then will be pivoted to the second or feathered position. As a result, overspeeding is prevented and the blade suffers no damage, and yet the windmill can continue to rotate and generate power. Rotational speeds are relatively constant over a wide range of wind velocities. All of this is accomplished without any kind of complicated centrifugal force mechanism. Only the force of the air reacting against the tab results in the generation of forces which will cause the blades to pivot to the feathered position against the resistance of the resilient force that bias them to the opposite position. The tab must be at or near the outer end of the blade in order to function in this manner, because the velicity of the blade is much greater than it is at the root of the blade. This results in an aerodynamic force on the tab which is sufficient to pivot the blade to the feathered position. At such time as the strong winds disappear, the blade will be returned to its original position by the spring force.

As an added feature, universal joints are provided in the output drive shaft of the windmill, causing the vertical axis of this drive shaft to fall along the pitch line of the bevel gear driven by the rotor. This avoids torque forces on the mill, as normally occur from the output drive gear arrangement.

DETAILED DESCRIPTION OF THE INVENTION

Figure 2:
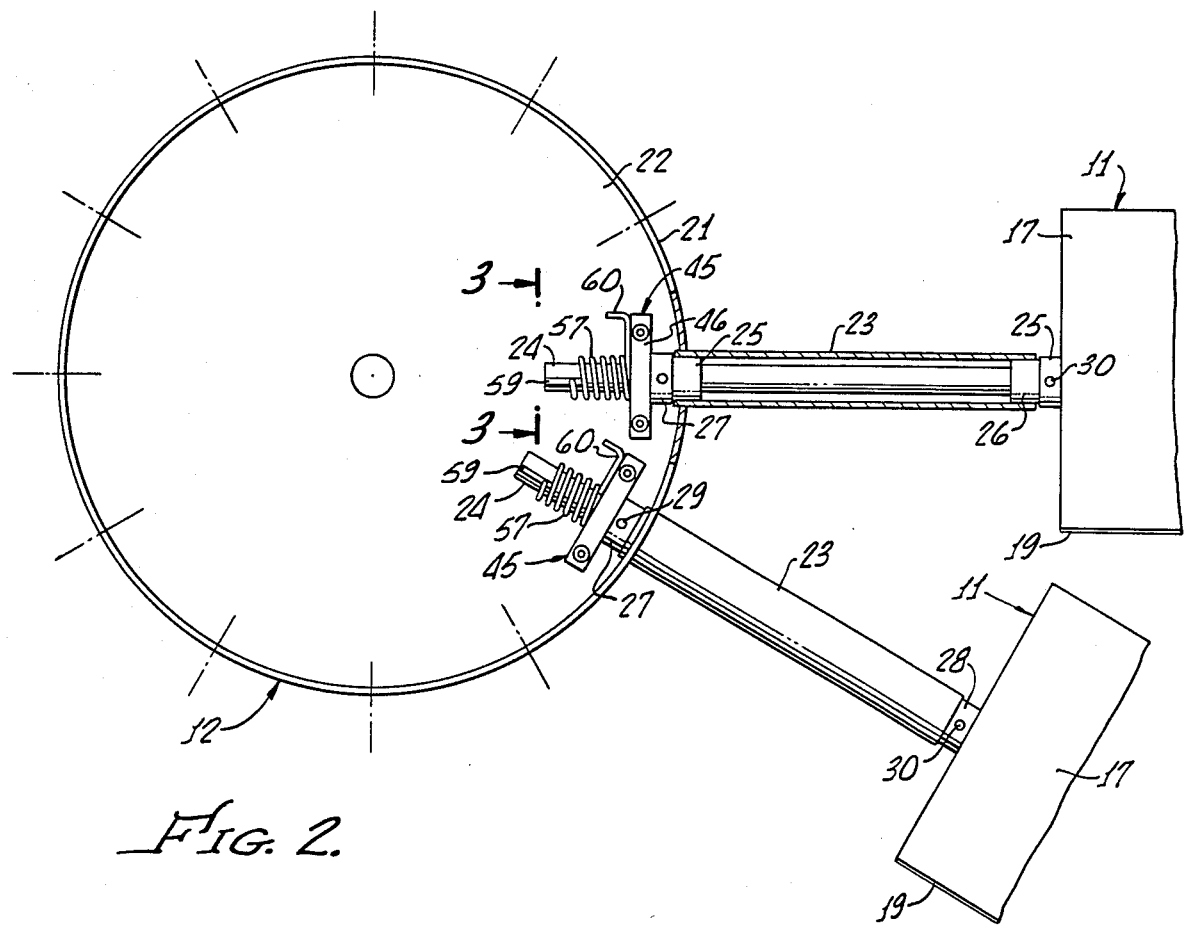
FIG. 2 is an enlarged fragmentary plan view, partially in section, of the hub and blade mounting arrangement.
Figure 1:
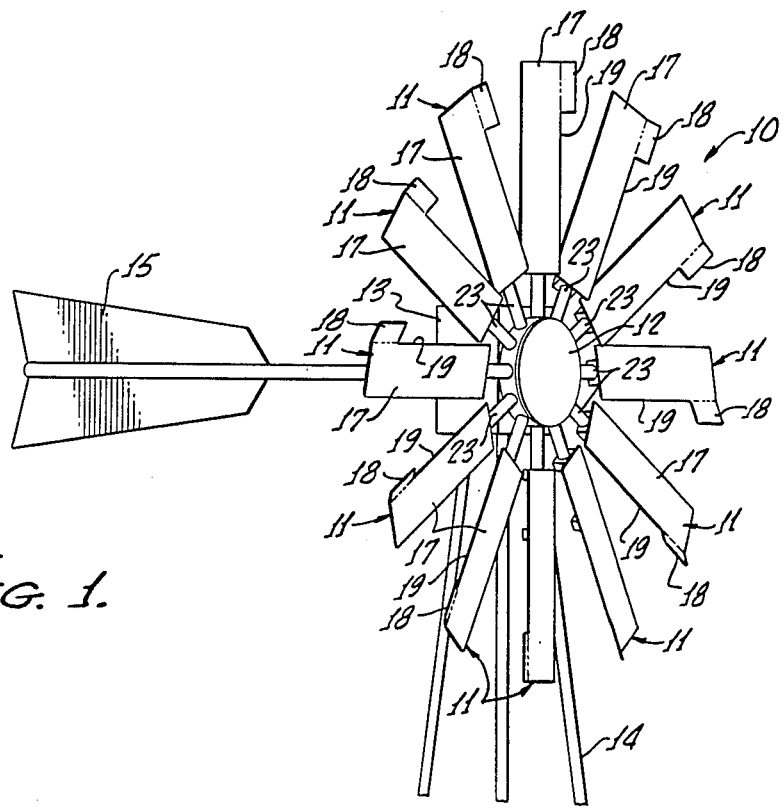
FIG. 1 is a fragmentary perspective view of a windmill constructed in accordance with this invention.

In the example illustrated in FIG. 1, the windmill 10 includes twelve blades 11 connected to a rotatable hub 12. The hub 12 is carried by a housing 13 at the top of a conventional tower 14. The housing 13 is rotatable in a horizontal plane relative to the tower 14 in the usual manner. A vane 15 accomplishes the rotation of the housing 13 to maintain the blades 11 of the windmill in a position facing the wind.

Each of the blades 11 includes a rectangular flat strip of material 17 having a relatively small tab 18 projecting from the outer end of the leading edge 19 of the blade. The tab 18 is at an obtuse angle relative to that of the rectangular strip 17. Typically, the plane of the tab 18 is bent forwardly at a 160° angle relative to the rectangular strip 17. For a blade section 17 which is four feet long and one foot wide, the tab 18 may be one foot in length and six inches in width, i.e., one-fourth the length and half the width. The function of the tab 18 in controlling the angle of the blade 11 is discussed below.

The hub 12 is hollow and cylindrical in shape. Included is a circumferential wall 21 and a radial inner end wall 22. Twelve equally spaced openings are provided in the circumferential wall 21, each receiving a radially outwardly projecting tube 23. The tubes 23 are welded to the circumferential wall 21 at the locations where they pass through that wall. A shaft 24 extends through each of the tubes 23 and projects beyond the tube at either end. Within each tube 23 are two spaced ball bearings 25 and 26 which rotatably mount the shaft 24. Collars 27 and 28 circumscribe the shaft 24 adjacent the inner and outer ends of the tube 23 and are held to the shaft by suitable means, such as set screws 29 and 30. The collars 27 and 28, being positioned adjacent the bearings 25 and 26, act as stops to prevent axial movement of the shafts 24 relative to the hub 12.

Each blade 11 is secured to the outer end portion of a shaft 24, beyond the tube 23, by two spaced mounting blocks 32 and 33 and transverse strips 34 and 35, which extend the width of the rectangular portion 17 of the blade. The mounting block 32 consists of elongated rectangular members 37 and 38, each having a recess defining an arc of slightly less than 180°. The members 37 and 38 are placed on opposite sides of the shaft 4. Bolts 39 extend through the members 37 and 38, as well as through the strip 34 and the rectangular part 17 of the blade at its inner end. Tightening of the bolts clamps the members 37 and 38 onto the shaft 24.

The mounting block 33 is constructed identically to the mounting block 32. The angle of the blade relative to the shaft 24 can be established by clamping the mounting blocks 32 and 33 at a desired relative angular position.

Additional screws 41 extend through the strip 34 and the rectangular part 17 of the blade at its inner end, strengthening the attachment to the shaft 24. Similarly, screws 42 connect the blade portion 17 to the strip 35.

A screw 43 extends through the shaft 24 near its outer end and adjacent the mounting block 33. The screw 43 projects radially beyond the periphery of the shaft 24 and acts as a safety stop to assure that the blade 11, under no circumstances, can be thrown off of the shaft 24.

A rotational stop 45 is provided at the inner end portion of the shaft 24 just beyond the collar 27. The stop 45 includes a rectangular member 46 having a recess 47 in one longitudinal edge which is complementary to the shaft 24. Also part of the stop 45 is a rectangular piece 48. The latter fits within a recess 49 formed in the shaft 24, the recess having a flat inner edge. Screws 51 extend through the stop member 46 and are received within tapped openings 52 in the stop member 48. This holds the stop to the shaft 24 in a fixed rotational position relative to the shaft.

Figure 3:
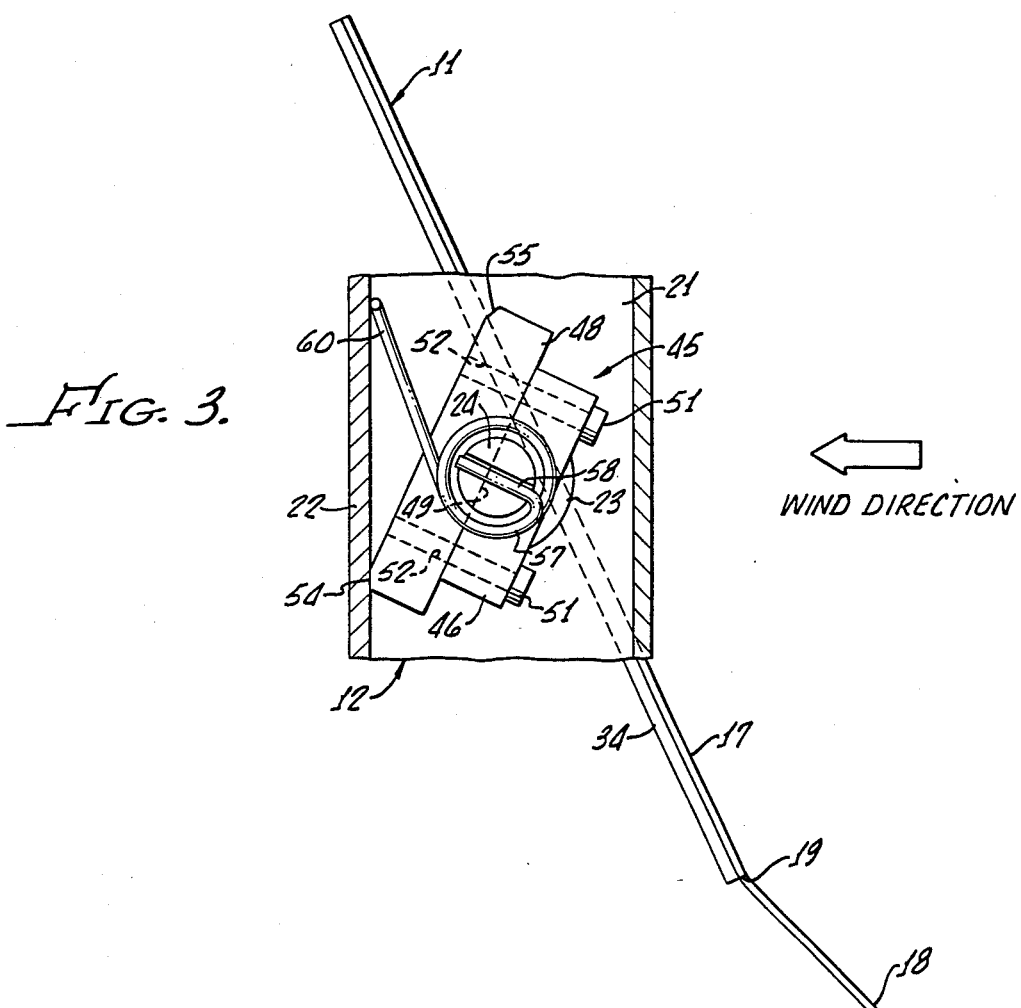
FIG. 3 is an enlarged fragmentary sectional view taken along line 3—3 of FIG. 2, illustrating the blade mounting arrangement with the blade pivoted to its first extreme position for rotation under light winds.
Figure 4:
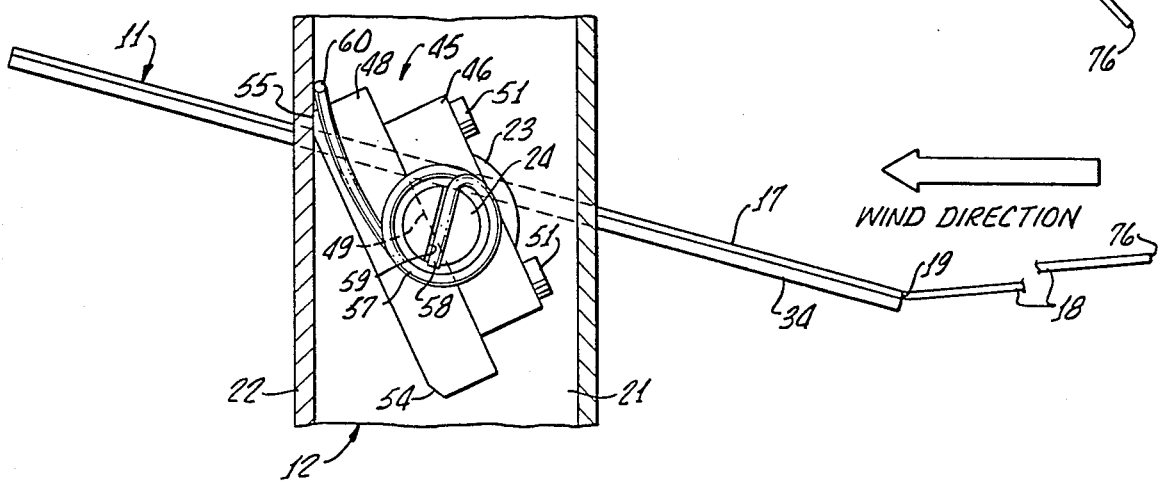
FIG. 4 is a view similar to FIG. 3, but with the blade shifted to its opposite extreme position which it assumes under conditions of strong Winds.
Figure 5:
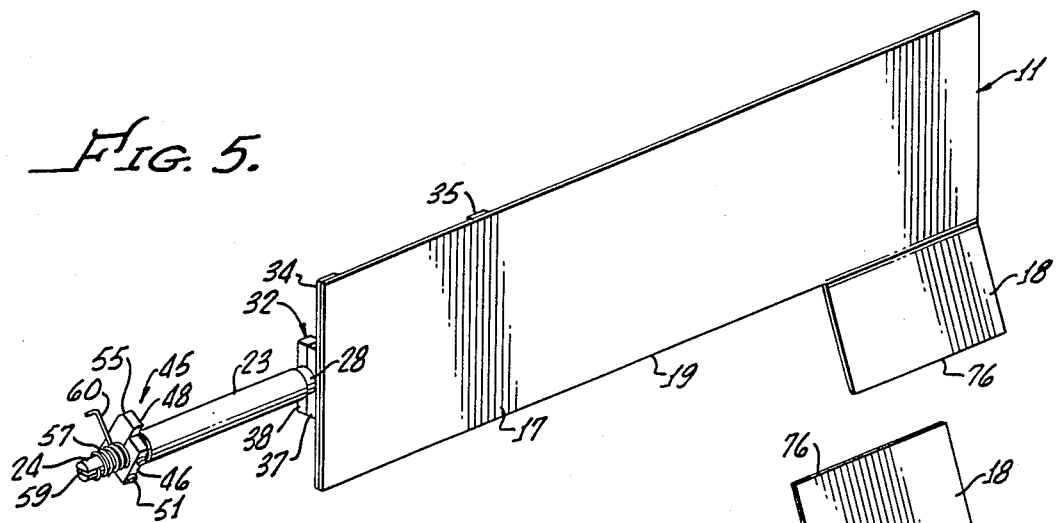
FIG. 5 is a perspective view of the one of the blades and the elements for mounting the blade on the hub.
Figure 6:
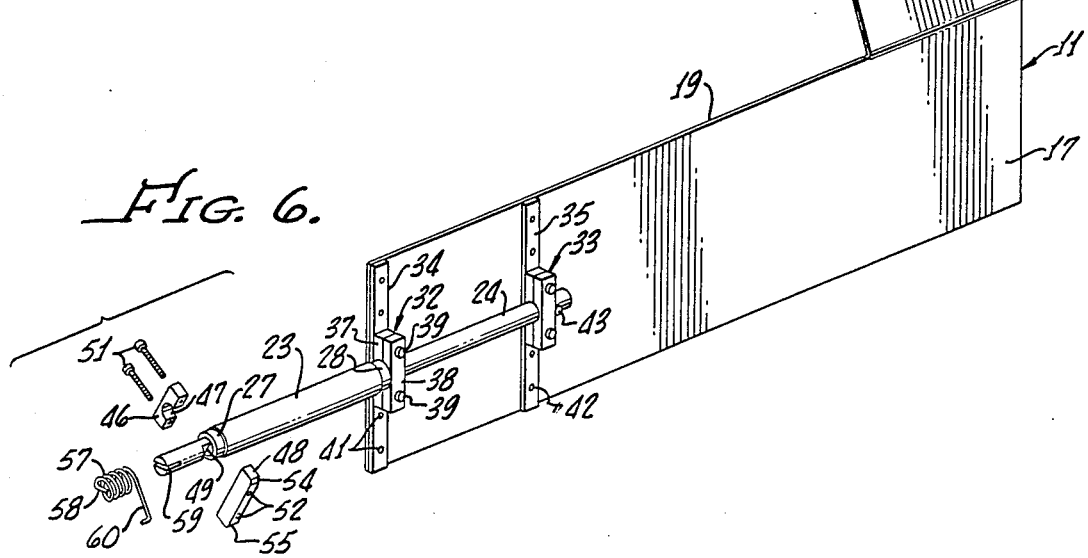
FIG. 6 is a view similar to FIG. 5, but shown from the opposite side of the blade and with the stop and spring portions of the mounting arrangement shown exploded.
Figure 7:
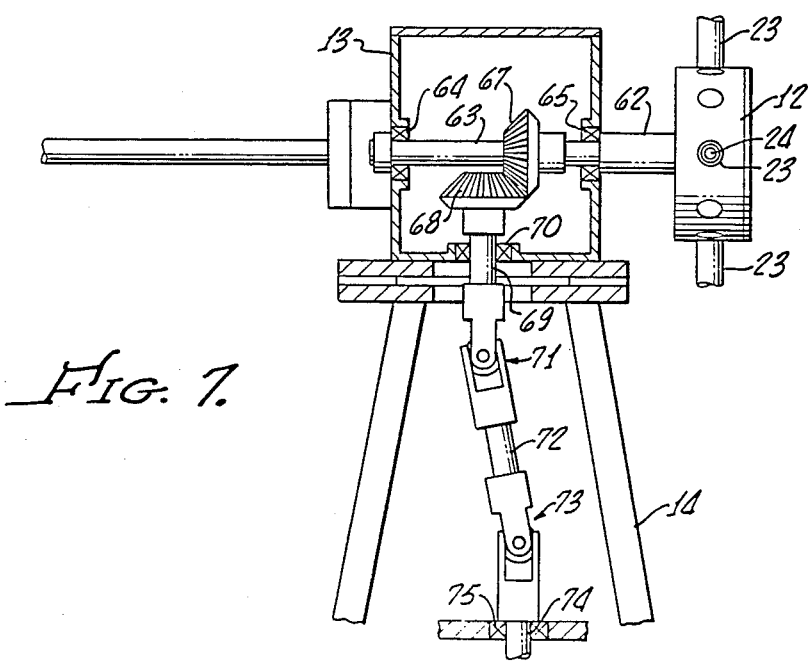
FIG. 7 is a fragmentary longitudinal sectional view showing the hub and the gearing arrangement for driving the output shaft of the mill.

The stop limits the pivotal movement of the blade 11 in the manner shown in FIGS. 3 and 4. In one extreme position of the blade 11, one outer corner 54 of the stop member 48 bears against the inner radial end wall 22 of the hub 12. Further rotation in the clockwise direction, as the device is shown in FIG. 3, is prevented by this engagement. The opposite end corner 55 will engage the radial end wall 22 of the hub 12 in the opposite extreme position of the blade 11. Counterclockwise rotation beyond the position of FIG. 4 thus is precluded. The corners 54 and 55 may be made flat so as to result in effective stop surfaces when they engage the wall 22.

The blade 11 is spring-biased to the position of FIG. 3, where, as illustrated, it has been rotated clockwise so as to bring the corner 54 into engagement with the wall 22 of the hub. As so positioned, the rectangular section 17 of the blade 11 is at an angle of approximately 25° with respect to a radial plane within which fall the axes of the shafts 24. This positioning of the blades is accomplished by torsion springs 57, at one end of which are radial sections 58 that fit within slots 59 in the ends of the shafts 24. The opposite ends 60 of the torsion springs 57 project away from the spring coil to engage the end wall 22 of the hub 12.

Projecting rearwardly from the end wall 22 at the axis of the hub 12 is a tube 62, the outer end of which is adjacent the housing 13. A shaft 63, mounted on bearings 64 and 65 within the housing 13, projects into the tube 62, and hence supports the hub 12. A bevel gear 67 is carried by and rotates with the shaft 63. A second bevel gear 68 meshes with the gear 67 and drives the output shaft 69 that extends downwardly through the bottom wall of the housing 13 and rotates within a bearing 70. The shaft 69 is short and at its lower end connects to a universal joint 71 which, through a stub shaft 72, connects to a second universal joint 73. The latter universal joint drives a vertical output shaft 74 that extends down to ground level, and at its upper end is held within a bearing 75. The two universal joints 71 and 73 move the axis of the output shaft 74 away from the axis of the bevel gear 68 and position it in alignment with the pitch circle of the bevel gear 67. This is to eliminate torque imposed upon the windmill by the output drive gears 67 and 68.

Under light wind conditions, the blades 11 are at a relatively high angle relative to the direction of the wind, as shown in FIG. 3. The blades 11 assume this position because the torsion springs 57 bias them rotationally about the axis of the shafts 59 to the position where the corners 54 of the stops 46 bear against the end wall 22 of the housing 12. In this position of the blades, the tabs 18, at their outer ends, make a more shallow angle relative to the wind direction than do the principal portions 17 of the blades. In the example given, the blade sections 17 are then at an angle of about 65° relative to the wind direction, and the tabs 18 are at an angle of around 45° relative to the wind (assuring horizontal wind flow, parallel to the axis of rotation of the hub 12). The blades rotate in a plane perpendicular to the direction of the wind, which is a plane perpendicular to the axis of rotation of the hub. The tabs 18, positioned in this manner, increase the torque force on the windmill under light wind conditions and assist in getting the rotor of the mill started. The blades will remain in the position of FIG. 3 at moderate wind velocities.

However, as the mill turns, an aerodynamic force is generated by the tabs as the air resists the rotational movement of the tabs. This force is on the underside of the tab 18, as illustrated in FIGS. 3 and 4. As rotational speeds increase, this force becomes greater and ultimately will overcome the springs 57 so that the blades pivot toward the feathered position of FIG. 4. The corners 55 of the stops 46 engage the end wall 22 of the housing when the blades are in the full feathered position. Overspeeding is prevented and a relatively constant rotational velocity is achieved under very strong wind conditions by this automatic feathering of the blades.

In the extreme position of FIG. 4, the principal portions 17 of the blades are at relatively flat angles relative to the direction of the wind. This angle may be around 15°. The tabs 18 then are at a reverse angle relative to the wind direction, inclining upwardly from the leading edges 19 of the blade sections 17. Thus, when the blade is viewed in its horizontal position (FIG. 4), the tab 18 inclines downwardly from its leading edge 76 while the blade section 17 inclines in the opposite direction, that is, upwardly from its leading edge 19. In other words, relative to the direction of the wind, the principal part of the blade 17 inclines in one direction and the tab 18 inclines in the opposite direction.

The windmill of this invention, therefore, is self-regulating so that it will not overspeed and becomes automatically feathered under high wind conditions. Complex and unreliable centrifugal force mechanisms are avoided. It is not necessary to turn the rotor of the windmill out of the direction of the wind under high velocity conditions, and instead the windmill may continue to do its work.

The foregoing detailed description is to be clearly understood as given by way of illustration and example only, the spirit and scope of this invention being limited solely by the appended claims.

What is claimed is:

1. A windmill comprising
   a hub,
   means for mounting said hub for rotation about a generally-horizontal axis,
   a plurality of blades,
   means for connecting said blades to said hub such that said blades project radially from said hub and are adapted to receive wind traveling in a direction toward said blades and generally parallel to said axis,
   said means for connecting said blades to said hub including means for permitting pivotal movement of said blades about a longitudinal axis for varying the angle of each of said blades relative to said direction between a first position in which said blades are at a relatively large angle relative to said direction and a second position in which said blades are at a relatively shallow angle relative to said direction,
   and resilient means biasing said blades to said first position,
   each of said blades including an elongated principal portion having a leading edge, and a relatively small tab means projecting from said leading edge and spaced from said longitudinal axis, said tab means being shorter than said elongated principal portion and located substantially at the outer end thereof,
   said tab means being at a more shallow angle relative to said direction than is said principal portion when said blade is in said first position thereof, whereby when said blade is rotated the resistance of the air to the rotation of said tab means generates a force on said tab means so that said tab means causes said blade to pivot from said first position to said second position thereof in opposition to said resilient means when said blade is subjected to relatively high rotational velocities.

2. A device as recited in claim 1 in which each of said tab means is a generally flat, substantially rectangular element.

3. A device as recited in claim 2 in which the width of said tab means is about one half of the width of said principal portion from which it projects.

4. A device as recited in claim 1 in which each of said tab means is in a fixed angular position relative to said principal portion of said blade.

5. A device is recited in claim 1 in which said principal portions, when said blades are in said first position, are at an angle of around 85° relative to said direction, and in said second position of said blades are at an angle of around 15° relative to said direction.

6. A device as recited in claim 1 in which said tab means are at an angle of around 160° relative to said principal portions.

7. A device as recited in claim 1 in which, when said blades are in said second position thereof, said principal portions incline one way relative to said direction and said tabs incline the opposite way relative to said direction.

8. A device as recited in claim 1 in which said hub includes a housing having a cylindrical wall, said means for connecting said blades to said hub includes a tube projecting radially outwardly for each of said blades, each of said blades having a shaft at the inner end thereof extending through said tube, and including bearing means within said tube for supporting said shafts.

9. A device as recited in claim 1 including for each blade a stop carried by said shaft within said housing, said stop including a member engageable with a surface within said housing in either of said two positions of said blades for limiting pivotal movement of said blades.

10. A device as recited in claim 9 in which said means for resiliently biasing said blades to said first position includes a torsion spring, one end of which it fixed relative to said shaft and the other end of which engages a wall of said housing so that said torsion spring exerts a rotational force upon pivoting of said shaft of said blade.

* * * * *